US010782748B1

(12) United States Patent
Tsorng et al.

(10) Patent No.: US 10,782,748 B1
(45) Date of Patent: Sep. 22, 2020

(54) CHASSIS FOR HARD DISK DRIVES

(71) Applicant: QUANTA COMPUTER INC., Taoyuan (TW)

(72) Inventors: Yaw-Tzorng Tsorng, Taoyuan (TW); Chun Chang, Taoyuan (TW); Chen Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/425,084

(22) Filed: May 29, 2019

Related U.S. Application Data

(60) Provisional application No. 62/824,023, filed on Mar. 26, 2019.

(51) Int. Cl.
*G06F 1/16* (2006.01)
*G06F 1/18* (2006.01)
*G11B 33/12* (2006.01)

(52) U.S. Cl.
CPC ............ *G06F 1/187* (2013.01); *G11B 33/128* (2013.01); *G06F 1/16* (2013.01)

(58) Field of Classification Search
None
See application file for complete search history.

(56) References Cited

U.S. PATENT DOCUMENTS

| 9,025,278 B1* | 5/2015 | Chen | G11B 5/39 360/99.15 |
| 2010/0172087 A1* | 7/2010 | Jeffery | G11B 33/02 361/679.33 |
| 2012/0236511 A1* | 9/2012 | Shu | G11B 33/124 361/748 |

FOREIGN PATENT DOCUMENTS

| CN | 104460872 A | 3/2015 |
| EP | 2031597 A2 | 3/2009 |
| EP | 3232296 A1 | 10/2017 |
| TW | M422142 U1 | 2/2012 |
| TW | M534415 U | 12/2016 |
| WO | 2010032907 A1 | 3/2010 |

OTHER PUBLICATIONS

Extended European Search Report for EP Application No. 19202552. 6, dated May 11, 2020.
TW Office Action for Application No. 108131422, dated Jul. 16, 2020, w/ First Office Action Summary.
TW Search Report for Application No. 108131422, dated Jul. 16, 2020, w/ First Office Action.

* cited by examiner

*Primary Examiner* — Courtney L Smith
*Assistant Examiner* — Rashen E Morrison
(74) *Attorney, Agent, or Firm* — Nixon Peabody LLP

(57) ABSTRACT

A hard disk drive (HDD) carrier bracket for use in mounting a hard disk drive (HDD) in a chassis via a HDD tray includes a first frame member and a second frame member. The second frame member is coupled to the first frame member such that the first and second frame members are moveable relative to one another, between an extended position and a collapsed position. The HDD carrier bracket is installable in the HDD tray without tools. The HDD tray is installable in the chassis without tools.

19 Claims, 13 Drawing Sheets

CHASSIS FOR HARD DISK DRIVES

CROSS-REFERENCE TO RELATED APPLICATIONS

This application claims priority under 35 U.S.C. § 119 to U.S. Provisional Application No. 62/824,023, entitled "88 3.5" Bare HDD design in 447 mm width chassis", and filed on Mar. 26, 2019. The contents of that application are hereby incorporated by reference in their entirety.

TECHNICAL FIELD

The present disclosure relates generally to computing devices, and more specifically, to chassis for storing and/or networking hard disk drives therein.

BACKGROUND

Frames or racks for mounting computing devices are typically designed to house standard sized chassis. For example, 1U, 2U, 3U, and 4U height chassis are typically mounted within a rack. Because the size of the racks and chassis that fit within the racks is typically standardized, the amount of space for mounting the computing devices within the chassis is predetermined for a given chassis height (e.g., 2U, 4U, 8U, etc.). Depending on the type of computing devices to be mounted, the arrangement of such computing devices is limited to the connection/mounting hardware that is needed to mount and electrically connect the computing devices within the chassis.

SUMMARY

The present disclosure is related to optimizing the standardized amount of space in a chassis having a given height (e.g., 4U) in order to maximize the number of hard disk drives and/or other computing devices that can be installed into a chassis. In some implementations, the present disclosure optimizes a 4U chassis to store eighty-eight standard sized 3.5 inch HDDs therein.

The present disclosure provides a hard disk drive (HDD) carrier bracket for use in mounting a hard disk drive (HDD) in a chassis via a HDD tray. The HDD carrier bracket includes a first frame member and a second frame member. The second frame member is coupled to the first frame member such that the first and second frame members are moveable relative to one another between an extended position and a collapsed position. The HDD carrier bracket is installable in the HDD tray without tools. The HDD tray is installable in the chassis without tools.

The present disclosure provides a hard disk drive (HDD) tray assembly configured to be mounted within a chassis. The HDD tray assembly includes a base, a first rail, a second rail, a third rail, a first HDD carrier bracket, and a second HDD carrier bracket. The first rail is coupled to the base adjacent to a first side of the base. The first rail forms at least two generally L-shaped slots therein. The second rail is coupled to the base adjacent to a second opposing side of the base. The second rail forms at least two generally L-shaped slots therein. The third rail is coupled to the base between the first and second sides of the base. The third rail forms at least four generally L-shaped slots therein. The first HDD carrier bracket is configured to be removably coupled to the at least two generally L-shaped slots of the first rail and a first pair of the at least four generally L-shaped slots of the third rail. The second HDD carrier bracket is configured to be removably coupled to the at least two generally L-shaped slots of the second rail, and a second pair of the at least four generally L-shaped slots of the third rail.

The present disclosure provides a hard disk drive (HDD) chassis assembly that includes a housing, a plurality of HDD tray assemblies, and a plurality of HDD carrier brackets. The housing includes a plurality of storage bays. Each of the plurality of HDD tray assemblies is configured to be removably positioned within one of the plurality of storage bays of the housing. Each of the plurality of HDD tray assemblies includes a rail. The rail forms at least one generally L-shaped slot therein. Each of the plurality of HDD carrier brackets is configured to be removably coupled to each of the plurality of HDD tray assemblies via the generally L-shaped slot of the rail. Each of the plurality of HDD carrier brackets includes a first frame member coupled to a second frame member such that the first and second frame members are moveable relative to one another between an extended position and a collapsed position.

The present disclosure provides a hard disk drive (HDD) carrier bracket for use in mounting a hard disk drive (HDD) in a chassis via a HDD tray. The HDD carrier bracket includes a first generally C-shaped frame member, a second generally C-shaped frame member, a chassis mounting pin, and a flexible tab. The first generally C-shaped frame member has an outer surface and an opposing inner surface. The first generally C-shaped frame member includes a first HDD mounting pin extending from the opposing inner surface of the first generally C-shaped frame member. The first HDD mounting pin is configured to engage a first HDD mounting aperture in a first side of the HDD. The first generally C-shaped frame member includes at least two extension pins extending from the outer surface of the first generally C-shaped frame member. The second generally C-shaped frame member has an outer surface and an opposing inner surface. The second generally C-shaped frame member includes a second HDD mounting pin extending from the opposing inner surface of the second generally C-shaped frame member. The second HDD mounting pin is configured to engage a second HDD mounting aperture in a second opposing side of the HDD. The second generally C-shaped frame member includes at least two extension slots that are configured to engage the at least two extension pins of the first generally C-shaped frame member in a sliding arrangement. As such, the first generally C-shaped frame member and the second generally C-shaped frame member are slidable relative to one another between an extended position and a collapsed position. The chassis mounting pin extends from the outer surface of the second generally C-shaped frame member. The chassis mounting pin is configured to engage a generally L-shaped slot of a partition of the HDD tray for removably coupling the HDD carrier bracket to the HDD tray. The flexible tab is coupled to the outer surface of the second generally C-shaped frame member. The flexible tab is configured to be being moved in a first direction to cause the chassis mounting pin to move within the generally L-shaped slot of the slide partition such that the HDD carrier bracket is removable from the HDD tray.

The above summary is not intended to represent each implementation or every aspect of the present disclosure. Rather, the foregoing summary merely provides an example of some of the novel aspects and features set forth herein. The above features and advantages, and other features and advantages of the present disclosure, will be readily apparent from the following detailed description of representative implementations and modes for carrying out the present disclosure, when taken in connection with the accompanying drawings and the appended claims.

BRIEF DESCRIPTION OF THE DRAWINGS

The disclosure will be better understood from the following description of exemplary implementations together with reference to the accompanying drawings.

Figure 1:
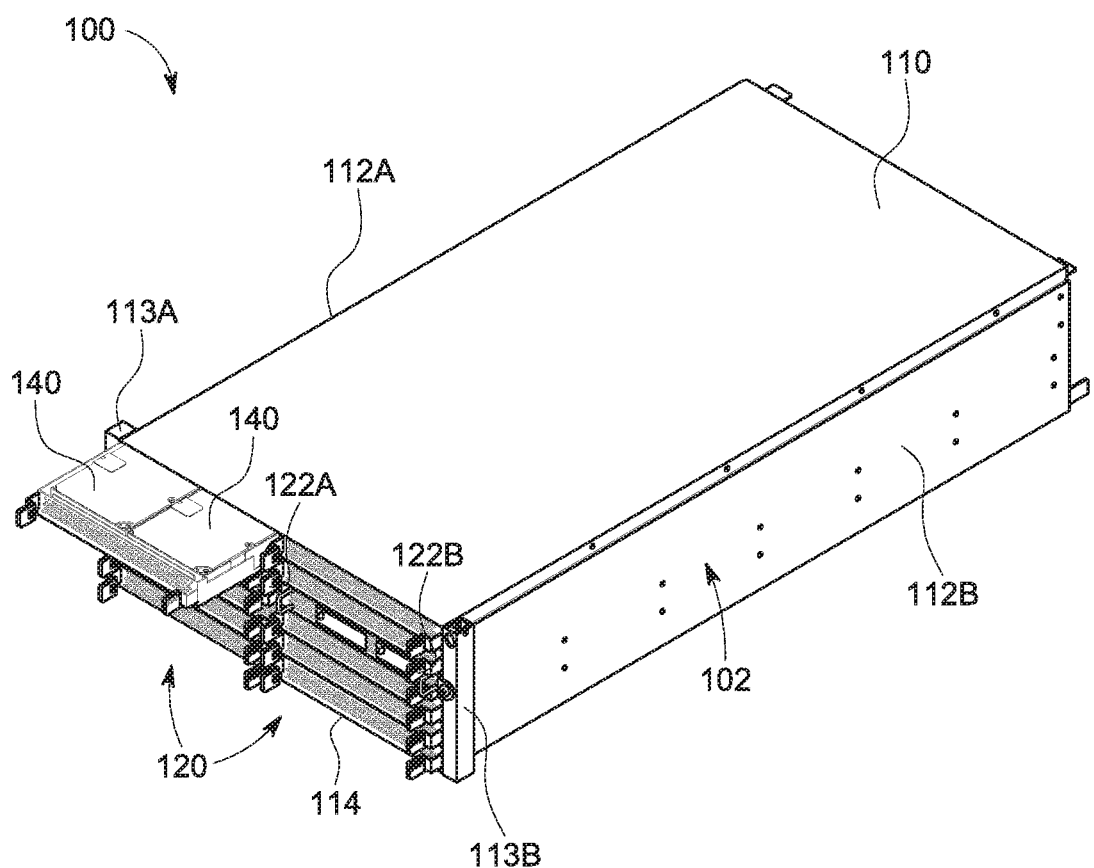
FIG. 1 is a perspective view of a HDD chassis assembly with a first one of a plurality of HDD tray assemblies partially removed, according to some implementations of the present disclosure.

The present disclosure is susceptible to various modifications and alternative forms. Some representative implementations have been shown by way of example in the drawings and will be described in detail herein. It should be understood, however, that the present disclosure is not intended to be limited to the particular forms disclosed. Rather, the disclosure is to cover all modifications, equivalents, and alternatives falling within the spirit and scope of the present disclosure as defined by the appended claims.

DETAILED DESCRIPTION

Referring generally to FIGS. 1-5, a hard disk drive (HDD) chassis assembly 100 includes a housing 102 and tray assemblies 120 removably coupled to the housing 102. The housing 102 has a lid 110 (shown in FIGS. 1 and 3, and removed in FIGS. 4 and 5), two opposing sides 112A, 112B (best shown in FIG. 5), and a base 114 (best shown in FIG. 5). The housing 102 can be formed from any number of separate and distinct parts/elements, or can be made from one monolithic part/element. For example, the base 114 and the two opposing sides 112A, 112B can be one monolithic part/element, and the lid 110 can be a separate part/element coupled to the two opposing sides 112A, 112B.

The housing 102 is a 4U housing having a height of about 176.2 millimeters, a width of about 447.8 millimeters, and a depth of about 866 millimeters. As such, the housing 102 can be mounted in a standard sized rack or frame (not shown) for storing electronic equipment such as the HDD chassis assembly 100. While the housing 102 is shown as having particular dimensions, various other heights, widths, and depths are contemplated to work with various different sized racks. Further, various other heights (e.g., 1U, 2U, 3U, 5U, 8U, 10U, etc.) of the housing 102 are contemplated to work within the same sized rack as the housing 102.

As shown, the housing 102 does not include a front panel or a rear panel, which remains open to permit other elements to be readily located at the front and rear of the housing 102. Alternatively, the housing 102 can include a front panel and/or a rear panel. In some such alternative implementations, the front panel would include a number of apertures to permit the tray assemblies 120 to pass through, and the rear panel would likewise include apertures to permit, for example, fans located in a rear compartment 119 (shown in FIG. 4) of the housing 102 to move air out of the housing 102.

Figure 5:
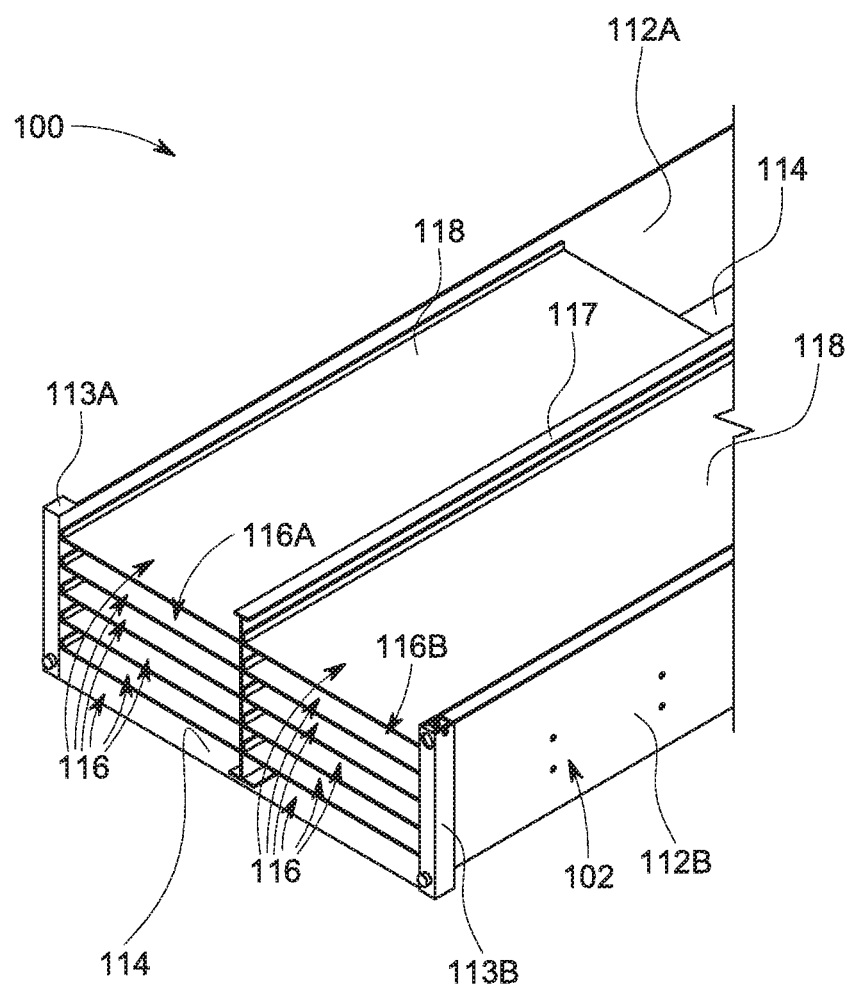
FIG. 5 is a partial perspective view of the HDD chassis assembly of FIG. 1 with the lid removed, all of the HDD tray assemblies removed, and the controller tray assembly removed to illustrate a plurality of storage bays of the HDD chassis assembly, according to some implementations of the present disclosure.

As shown in FIG. 5, where the lid 110 and the tray assemblies 120 are removed to better illustrate the inside of the HDD chassis assembly 100, the housing 102 includes and/or forms a number of storage bays 116 therein for receiving and/or supporting the tray assemblies 120 in the housing 102. Specifically, the housing 102 includes twelve storage bays 116. A first group of six of the storage bays 116 are formed in a first column 116A on the left side of the housing 102. A second group of six of the storage bays 116 are formed in a second column 116B on the right side of the housing 102 (where left/right is determined when facing the front of the HDD chassis assembly 100).

The columns 116A, 116B are generally defined by the two opposing sides 112A, 112B of the housing 102 and a central divider 117. The storage bays 116 within the columns 116A, 116B are generally formed/defined by a respective one of the two opposing sides 112A, 112B; the central divider 117; and a number of horizontal dividers 118 that are positioned and/or coupled between the two opposing sides 112A, 112B, and the central divider 117. For the two upper most storage bays 116 (e.g., one in the left column 116A and one in the right column 116B), the lid 110 aids in forming the storage bays 116. For the two lowermost storage bays 116 (e.g., one in the left column 116A and one in the right column 116B), the base 114 aids in forming the storage bays 116.

While twelve storage bays 116 in two columns 116A, 1116B are shown, any number of storage bays 116, in any number of columns, can be included in the housing 102. For such alternative implementations where the dimensions (described above) of the housing 102 are maintained, an increase in the number storage bays 116 requires each of the storage bays 116 to be reduced in size (e.g., reducing of height). Of course, such modification would require corresponding modifications to the components stored within the storage bays 116. For such alternative implementations where the dimensions of the housing 102 are modified (e.g., enlarged or decreased), the number of storage bays 116 can be increased while maintaining the size of each of the storage bays 116 by increasing the size of the housing 102 accordingly. Such modification would not require modifications to the components stored within the storage bays 116. Specifically, for example, as described above, the HDD chassis assembly 100 is a 4U chassis having a standard height of about 176.2 millimeters. An increase of the HDD chassis assembly 100 to be an 8U chassis, having a standard height of about 352.4 millimeters and the same width and depth as the HDD chassis assembly 100, would result in a chassis with twice the number of storage bays 116, in two columns 116A, 116B.

Figure 4:
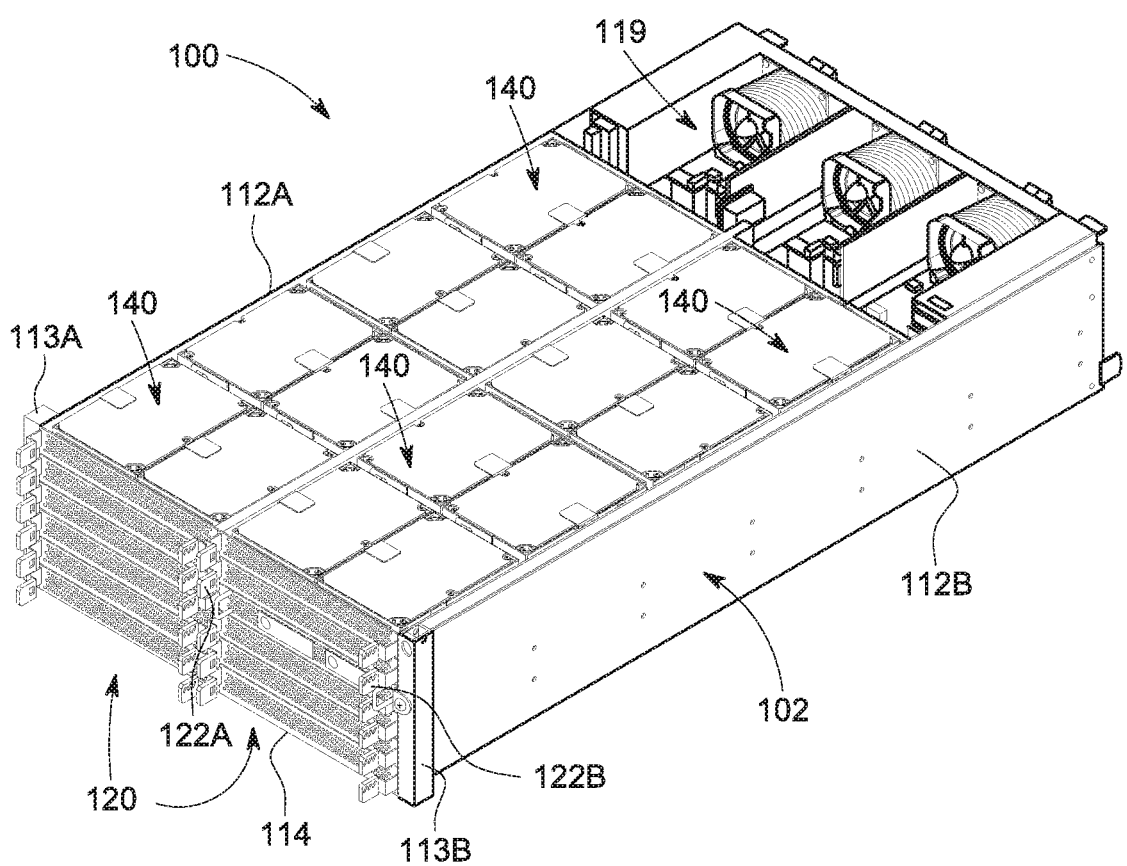
FIG. 4 is a perspective view of the HDD chassis assembly of FIG. 1 with a lid removed to better illustrate interior components, according to some implementations of the present disclosure.

As best shown in FIGS. 1, 4, and 5, the housing 102 includes a pair of mounting rails 113A, 113B. The first mounting rail 113A is coupled to or integral with the first side 112A of the housing 102. The second mounting rail 113B is coupled to or integral with the second side 112B of the housing 102. The mounting rails 113A, 113B aid in coupling the housing 102 to the rack and further act as stoppers to limit the movement of the housing 102 when being inserted into a rack. The mounting rails 113A, 113B can also be coupled to the rack via one or more fasteners (e.g., screws, nails, clips, etc.). In some implementations, the mounting rails 113A, 113B provide a location/mechanism for the tray assemblies 120 to removably attach to the housing 102.

Figure 2:
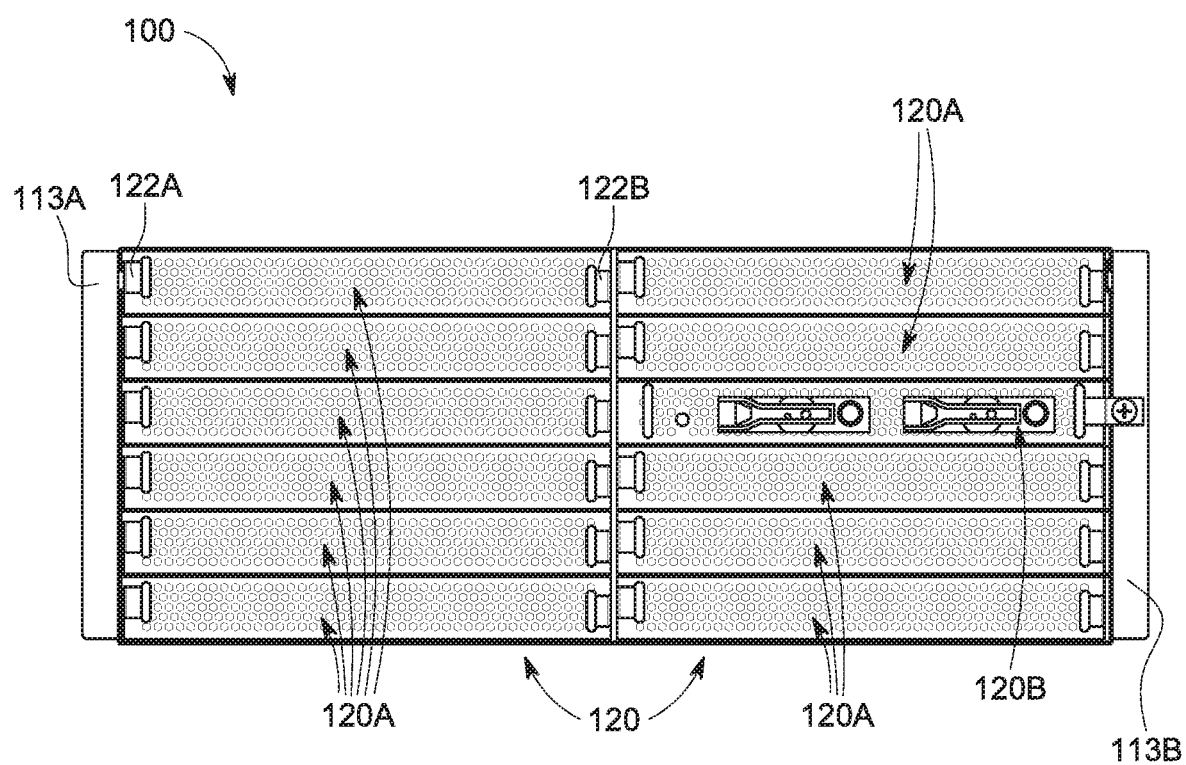
FIG. 2 is a front view of the HDD chassis assembly of FIG. 1 with the first HDD tray assembly fully installed.
Figure 3:
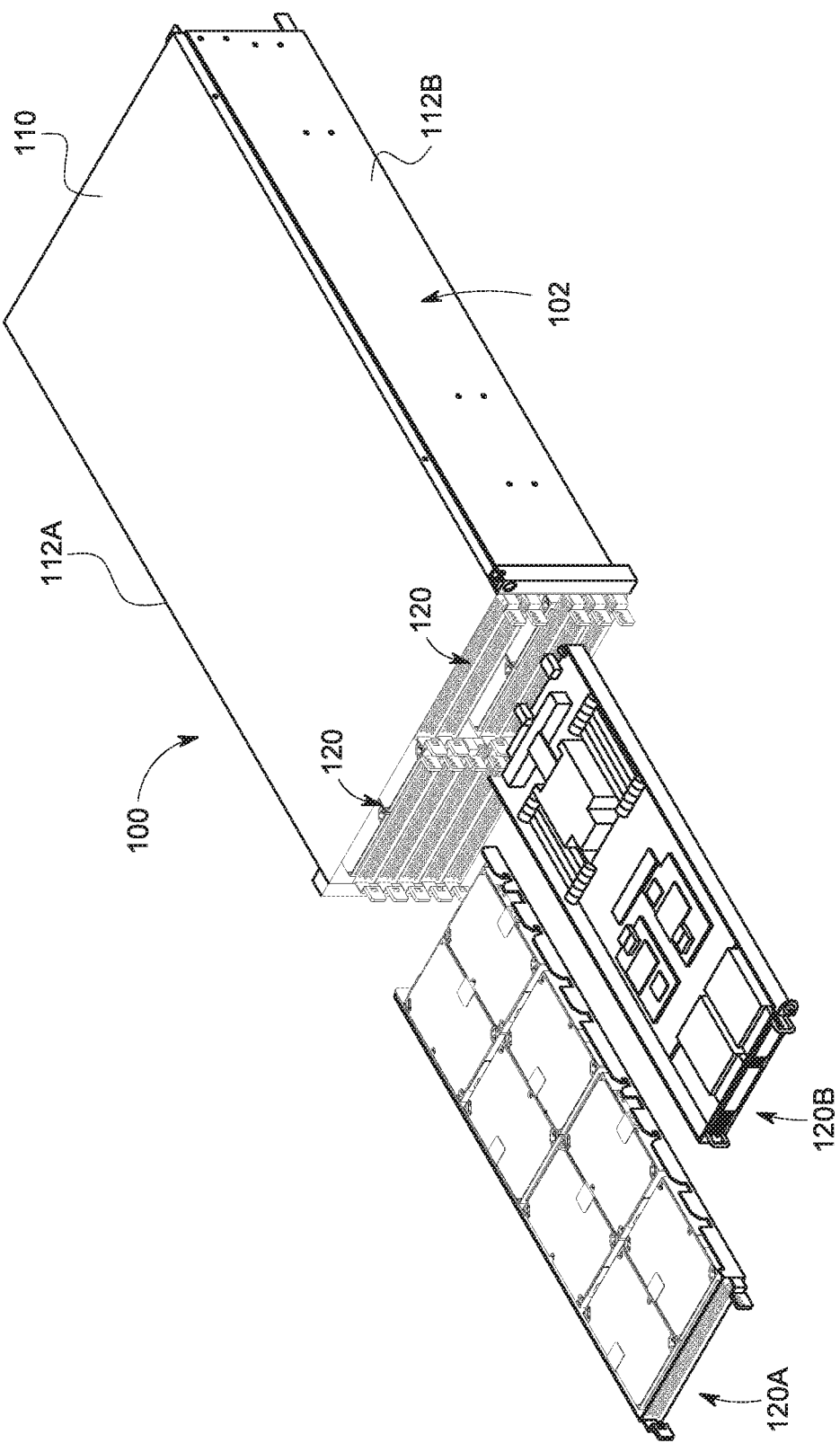
FIG. 3 is a perspective view of the HDD chassis assembly of FIG. 1 with the first HDD tray assembly fully removed and with a controller tray assembly fully removed, according to some implementations of the present disclosure.

As best shown in FIGS. 2 and 3, the tray assemblies 120 can include two different types of tray assemblies. For example, the tray assemblies 120 include a number of HDD tray assemblies 120A and one controller tray assembly 120B. In some implementations, the controller tray assembly 120B is included to aid in managing digital storage of HDDs 140 (FIGS. 7A and 7B) in the HDD tray assemblies 120A (e.g., sharing data between the HDDs 140, sharing resources throughout the HDD chassis assembly 100, etc.). Alternatively, in some implementations, the HDD chassis assembly 100 does not include the controller tray assembly 120B, but rather twelve HDD storage tray assemblies 120A. In some such implementations, one or more components of the controller tray assembly 120B are positioned within the rear compartment 119 (FIG. 4) of the housing 102. While the controller tray assembly 120B is shown in a specific location in the housing 102, the controller tray assembly 120B can be positioned in any of the storage bays 116.

To the rear of the storage bays 116 (shown in FIG. 5), as shown in FIG. 4, the housing 102 includes the rear compartment 119. The rear compartment 119 can include a number of electronic components for managing and/or aiding the efficient operation of the tray assemblies 120 and the HDDs 140, etc. therein. For example, power supplies, cables/connectors/couplers, processor(s), controller(s), fan(s), heat sink(s), etc. or any combination thereof can be positioned within the rear compartment 119 of the housing 102.

Figure 6:
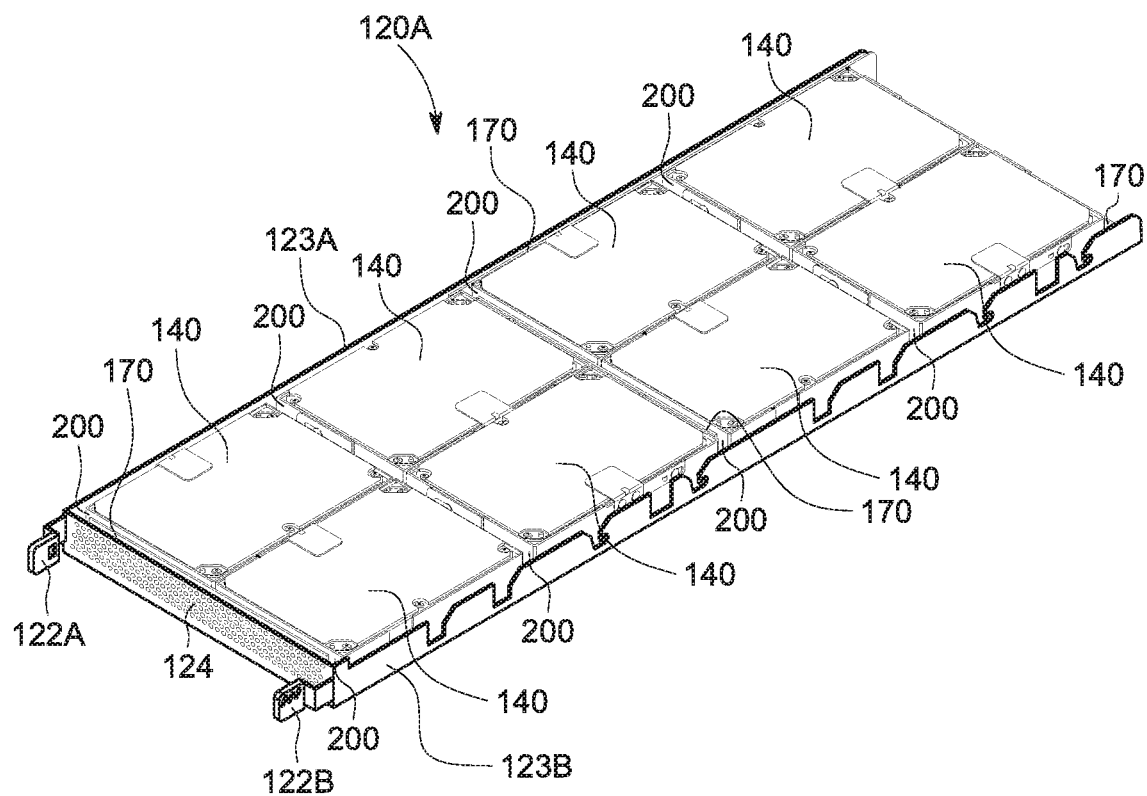
FIG. 6 is a perspective view of the first HDD tray assembly of FIG. 1.

Referring to FIG. 6, one of the HDD tray assemblies 120A is shown outside of the HDD chassis assembly 100. The HDD tray assembly 120A includes a pair of tray latches 122A, 122B that removably engage the HDD tray assembly 120A with the housing 102. That is, when the HDD tray assembly 120A is fully slid into and/or positioned within one of the storage bays 116 (shown in FIGS. 2 and 4), the pair of tray latches 122A, 122B engage corresponding latch receivers in the housing 102. The latch receivers can be formed in the first and second mounting rails 113A, 113B and/or in the central divider 117. To remove one of the tray assemblies 120 from the housing 102, the pair of tray latches 122A, 122B for the tray assembly 120 to be removed are biased or pushed inward, thereby decoupling the latching mechanism, and then the tray assembly 120 can be slid out of the housing 102.

Figure 10A:
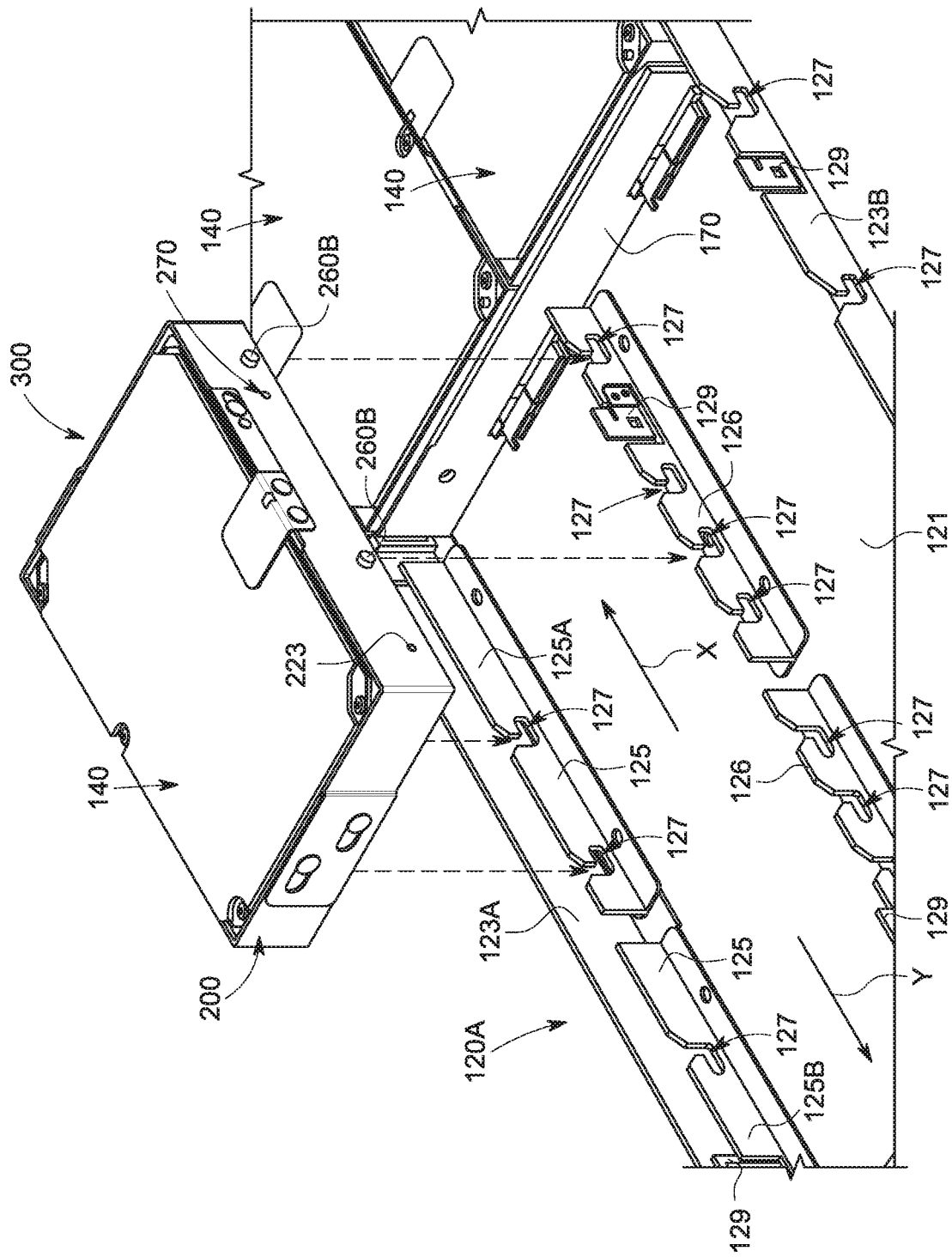
FIG. 10A is a perspective view of the HDD carrier bracket with the HDD installed therein of FIG. 9C being installed in the first HDD tray assembly according to some implementations of the present disclosure.

The HDD tray assembly 120A is sized and configured to hold eight HDDs 140 (best shown in FIGS. 7A and 7B), such that each of the HDDs 140 is electrically coupled to a common HDD backplane 170 (a portion of which is best shown in FIG. 10A). The HDD backplane 170 includes a number of portions or legs positioned throughout the HDD tray assembly 120A such that each of the HDDs 140 in the HDD tray assembly 120A is coupled via the HDD backplane 170 to a common location (e.g., a controller(s), a CPU(s), the controller tray assembly 120B, one or more components in the rear compartment 119, etc., or any combination thereof).

Figure 7A:
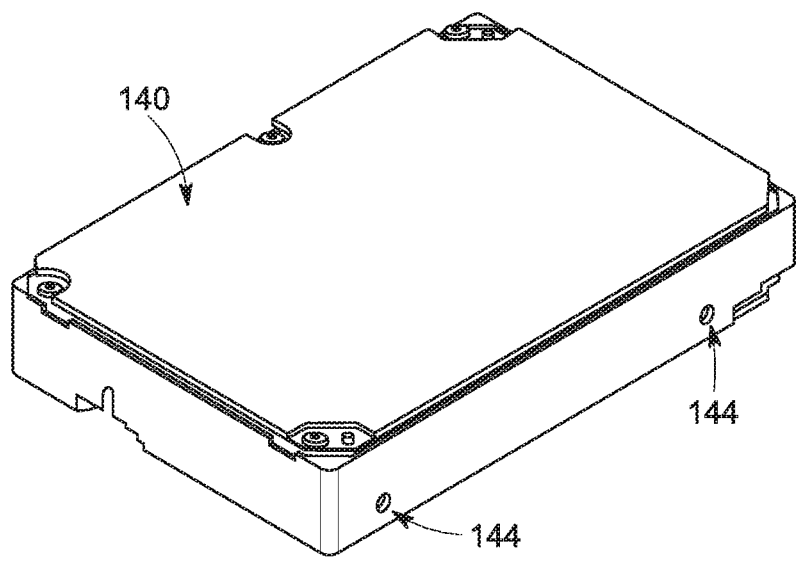
FIG. 7A is a front perspective view of a HDD of the first HDD tray assembly of FIG. 6.
Figure 7B:
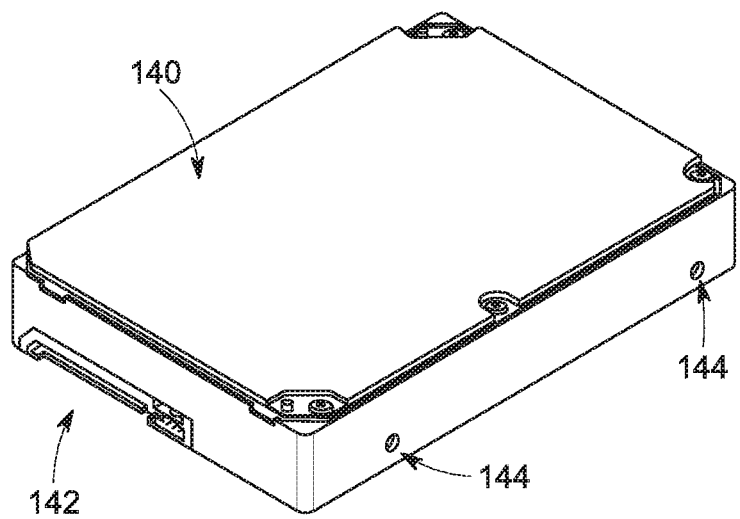
FIG. 7B is a rear perspective view of the HDD of FIG. 7A.

An exemplary one of the HDDs 140 is shown in FIGS. 7A and 7B. The HDD 140 is a standard 3.5 inch HDD, which has a width of about 4 inches, a length of about 5.8 inches, and a thickness or height of about 0.8 inches. In some alternative implementations, one or more of the HDDs 140 in the HDD chassis assembly 100 can be replaced with a 2.5 inch HDD, which has a width of about 2.7 inches, a length of about 3.96 inches, and a thickness or height of about 0.37 inches.

The HDD 140 includes an electronic coupler 142 generally located on a rear end of the HDD 140. As shown, the electronic coupler 142 is position adjacent to a lower edge of the rear end of the HDD 140, and adjacent to a first side (e.g., right side when looking at the HDD 140 from the front as in FIG. 7A) of the HDD 140. It is the electronic coupler 142 of each of the HDDs 140 that is coupled (mechanically and electrically) to the HDD backplane 170 when the HDDs 140 are installed in one of the HDD tray assemblies 120A. The HDD 140 further includes mounting bores 144 for use in coupling and/or attaching the HDD 140 to structures (e.g., the HDD carrier bracket 200). The mounting bores 144 can be threaded (as is typical in 3.5 inch HDDs) or unthreaded.

Figure 8A:
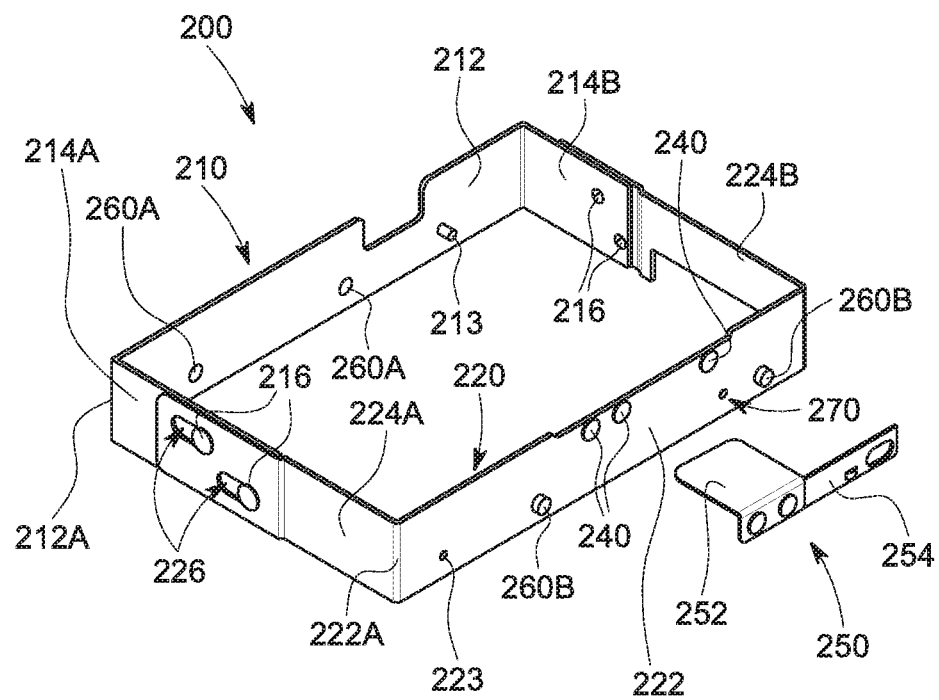
FIG. 8A is a partially exploded perspective view of a HDD carrier bracket of the first HDD tray assembly of FIG. 6, the HDD carrier bracket being in a collapsed position.
Figure 8B:
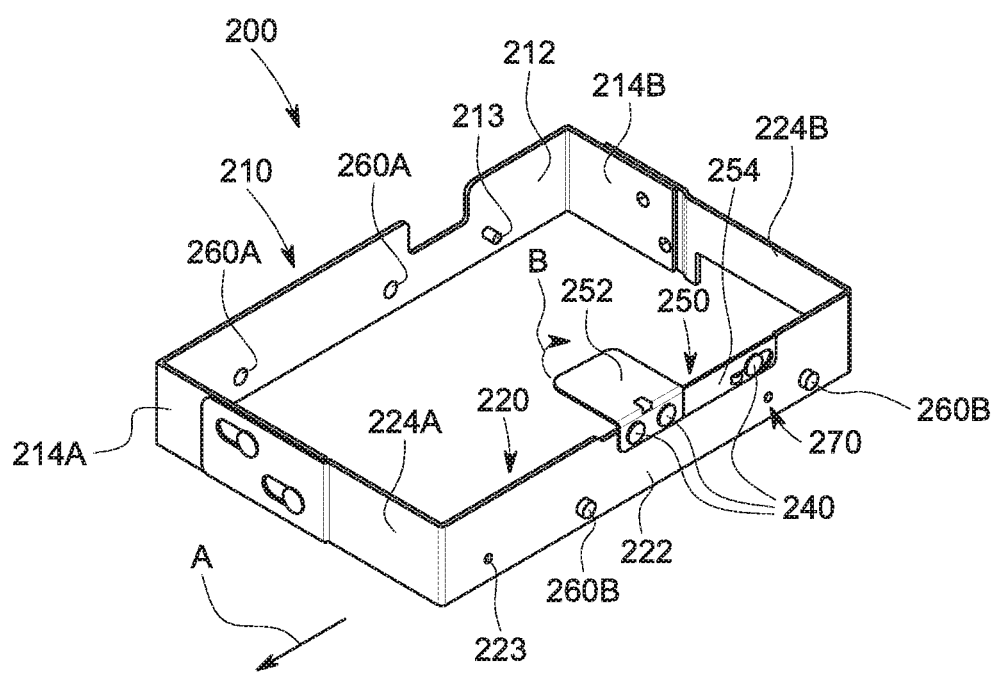
FIG. 8B is an assembled perspective view of the HDD carrier bracket of FIG. 8A.

Referring to FIGS. 8A and 8B, a HDD carrier bracket 200 is shown for coupling one of the HDDs 140 to the HDD tray assembly 120A (FIG. 6). That is, each of the HDDs 140 is coupled to or installed in one of the HDD tray assemblies 120A using one of the HDD carrier brackets 200. As such, the HDD chassis assembly 100 includes a multitude of HDD carrier brackets 200. In some implementations, the HDD chassis assembly 100 includes eighty-eight of the HDD carrier brackets 200 to couple eighty-eight of the HDDs 140 to the HDD tray assemblies 120A. Various other numbers of HDDs 140 (FIGS. 7A and 7B) and associated HDD carrier brackets 200 are contemplated as being included in the HDD chassis assembly 100.

The HDD carrier bracket 200 includes a first frame member 210 coupled to a second frame member 220. The first frame member 210 has a first body 212 and a first pair of arms 214A, 214B extending from the first body 212 such that the first frame member 210 has a generally C-shape. Similarly, the second frame member 220 has a second body 222 and a second pair of arms 224A, 224B extending from the second body 222 such that the second frame member 220 has a generally C-shape. The first body 212 and the first pair of arms 214A, 214B can be monolithic or multiple parts/elements coupled together. Similarly, the second body 222 and the second pair of arms 224A, 224B can be monolithic or multiple parts/elements coupled together.

The first frame member 210 includes two extension pins 216 extending from a first one 214A of the first pair of arms and two extension pins 216 extending from a second one 214B of the first pair of arms. While two extension pins 216 are shown for each of the arms 214A, 214B, any number of extension pins 216 is contemplated (e.g., one extension pin 216 per arm 214A, 214B, three extension pins 216 per arm 214A, 214B, etc.).

The second frame member 220 includes two extension slots 226 formed in a first one 224A of the second pair of arms, and two extension slots 226 formed in a second one 224B of the second pair of arms (not visible in FIGS. 8A and 8B). While two extension slots 226 are shown for each of the arms 224A, 224B, any number of extension slots 226 is contemplated (e.g., one extension slot 226 per arm 224A, 224B, three extension slots 226 per arm 224A, 224B, etc.). The number of extension slots 226 per arm 224A, 224B corresponds with the number of extension pins 216 for arm 214A, 214B.

Figure 9A:
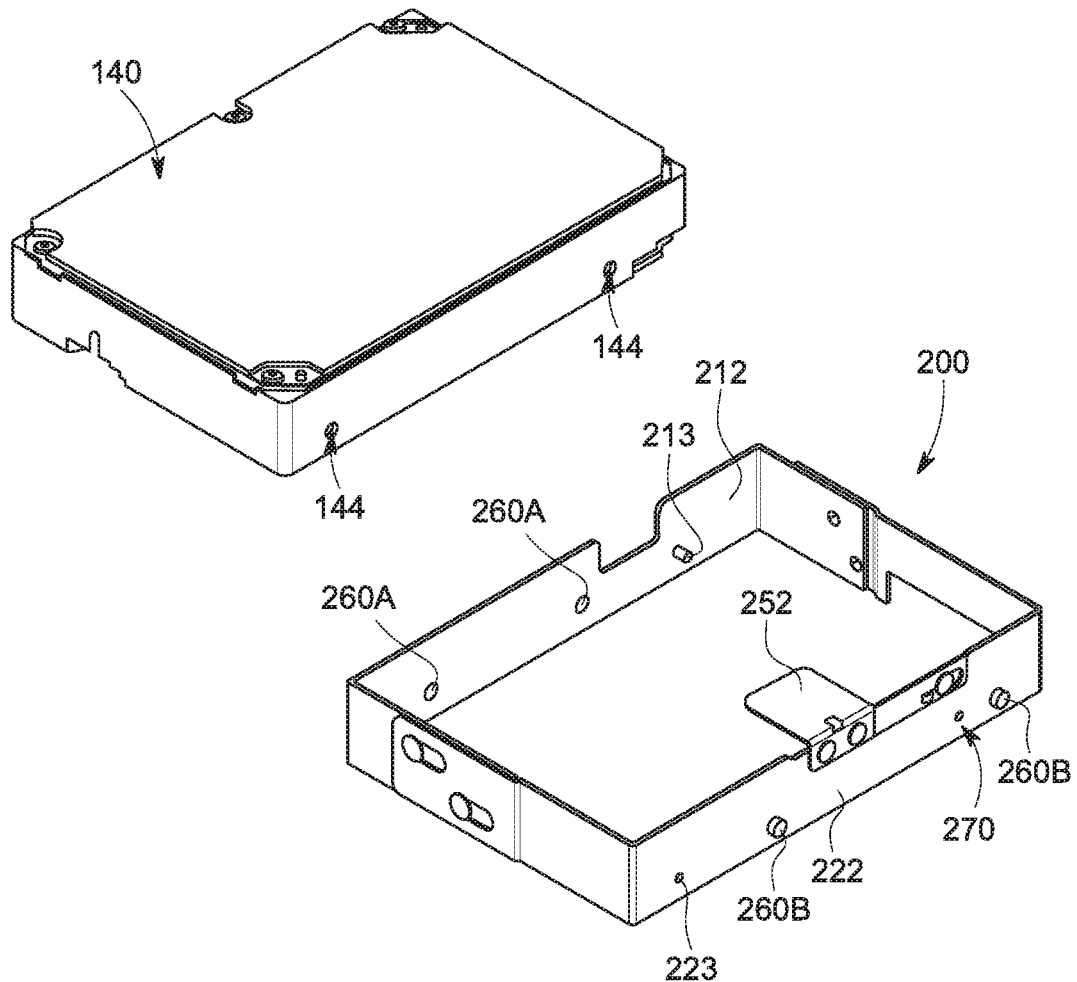
FIG. 9A is a perspective view of the assembled HDD carrier bracket of FIG. 8B, but in an extended position, with the HDD of FIG. 7A ready to be installed therein.
Figure 9B:
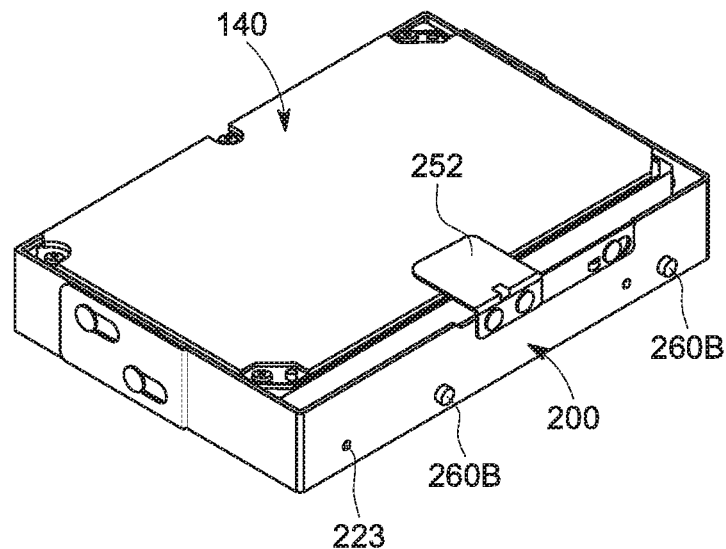
FIG. 9B is a perspective view of the HDD carrier bracket of FIG. 9A in the extended position with the HDD positioned therein.

The extension slots 226 are positioned and sized to couple with the extension pins 216, such that the first frame member 210 and the second frame member 220 are able to move (e.g., slide) relative to one another between a collapsed position (FIGS. 8A, 8B, 9C) and an extended position (FIGS. 9A and 9B). By including two extension pins 216 and two corresponding extension slots 226 on each side of the first and second frame members 210, 220, relative rotation of the first and second frame members 210, 220 can be prevented and/or minimized. The result is a relatively more rigid HDD carrier bracket 200, as compared with a HDD carrier bracket with only extension pin and one extension slot per side (not shown). Further, by staggering (e.g., not aligning in a vertical plane) the location of the two extension pins 216 and corresponding extension slots 226, the rigidity of the HDD carrier bracket 200 is relatively improved.

The first frame member 210 includes a first HDD mounting pin 213 extending inward from an inner surface of the first body 212. Similarly, the second frame member 220 includes a second HDD mounting pin 223 extending inward from an inner interior surface of the second body 222. The first and second HDD mounting pins 213, 223 are not threaded such that the first and second HDD mounting pins 213, 223 are configured to engage (e.g., in a slidable manner) respective ones of the mounting bores 144 (FIGS. 7A and 7B) of the HDD 140 when the first and second frame members 210, 220 are moved from the extended position (FIG. 9B) to the collapsed position (FIG. 9C).

While only one mounting pin 213 is shown as extending inward from the inner surface of the first body 212 and only one mounting pin 223 is shown as extending inward from the inner surface of the second body 222, it is contemplated that two mounting pins 213 can extend from the inner surface of the first body 212, and two mounting pins 223 can extend from the inner surface of the second body 222.

The location and spacing of the mounting pins 213, 223 are such that they can engage the mounting bores 144 of a standard HDD (e.g., a standard 3.5 inch HDD, a standard 2.5 inch HDD, etc.). In the implementation where only one mounting pin 213, 223 extends from each of the first and second frame members 210, 220, the mounting pins 213, 223 are staggered (e.g., not axially aligned) such that the HDD 140 does not rotate about the mounting pins 213, 223, when installed in the HDD carrier bracket 200.

Figure 9C:
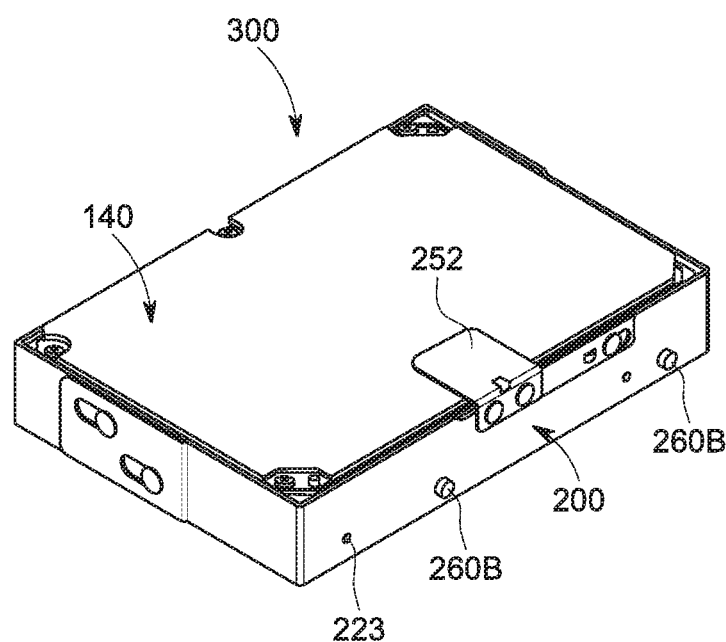
FIG. 9C is a perspective view of the HDD carrier bracket of FIG. 9B in the collapsed position with the HDD installed and/or secured therein.

As evident by comparing the HDD carrier bracket 200 in the collapsed position (FIGS. 8A, 8B, 9C) and the extended position (FIGS. 9A and 9B), an inner area defined by the first and second frame members 210, 220 is larger when the HDD carrier bracket 200 is in the expanded position (FIG. 9B), and smaller when in the collapsed position (FIG. 9C). The ability of the HDD carrier bracket 200 to move from the collapsed position (FIG. 9C) to the extended position (FIG. 9B) allows for one of the HDDs 140 to be position within the inner area of the HDD carrier bracket 200 (see FIG. 9A). Once the HDD 140 is positioned in the inner area of the HDD carrier bracket 200 (see FIG. 9B), the HDD carrier bracket 200 can be moved (e.g., slid) from the extended position (FIG. 9B) to the collapsed position (FIG. 9C) such that the HDD 140 is held by and/or secured to the HDD carrier bracket 200 via the mounting pins 213, 223 engaging the mounting bores 144 (FIGS. 7A and 7B).

Referring back to FIGS. 8A and 8B, the second body 222 of the second frame member 220 includes three tab pins 240 extending therefrom for engaging a tab assembly 250, and for aiding in securing the tab assembly 250 to the second frame member 220. The tab pins 240 can be rivets, screws, bolts, or the like, or a combination thereof. As best shown in FIG. 8A, the tab assembly 250 includes a generally flexible tab 252 attached to a rigid body 254. The rigid body 254 is fixedly attached to the second frame member 220 via the tab pins 240 such that movement of the flexible tab 252 causes a corresponding movement of the second frame member 220. For example, movement of the flexible tab 252 in the direction of arrow A (FIG. 8B) causes a corresponding movement of the rigid body 254 and of the second frame member 220. The flexible tab 252 can be made of a variety of materials, such as, for example, plastic, metal, fabric, etc. or any combination thereof. The flexible tab 252 is provided such that an operator (e.g., human) can bend/rotate the flexible tab 252 in the direction of arrow B to grasp it with two fingers, followed by a sliding movement in the direction of arrow A. The flexible tab 252 is designed such that a portion of the flexible tab 252 lays generally flat on an upper surface of the HDD 140 when the HDD is installed in the HDD carrier bracket 200. As such, the flexible tab 252 does not obstruct installation of the HDD tray assembly 120A into the housing 102.

The first body 212 of the first frame member 210 includes a first pair of chassis mounting pins 260A extending from an exterior surface of the first body 212. Similarly, the second body 222 of the second frame member 220 includes a second pair of chassis mounting pins 260B extending from an exterior surface of the second body 222. The first pair of chassis mounting pins 260A is spaced apart a first distance, and the second pair of chassis mounting pins 260B is spaced apart a second distance that is different from the first distance. As shown, the first distance is less than the second distance. Spacing the first and second pairs of chassis mounting pins 260A, 260B different distances, aids in preventing installation of the HDD carrier bracket 200 into the HDD tray assembly 120A in the wrong orientation. Further, each of the first pair of chassis mounting pins 260A is spaced from a first edge 212A of the first body 212 at a different distance than each of the second pair of chassis mounting pins 260B is spaced from a first edge 222A of the second body 222. Such differences in the spacing from the first edges 212A, 222A further aids in preventing installation of the HDD carrier bracket 200 into the HDD tray assembly 120A in the wrong orientation.

Figure 10B:
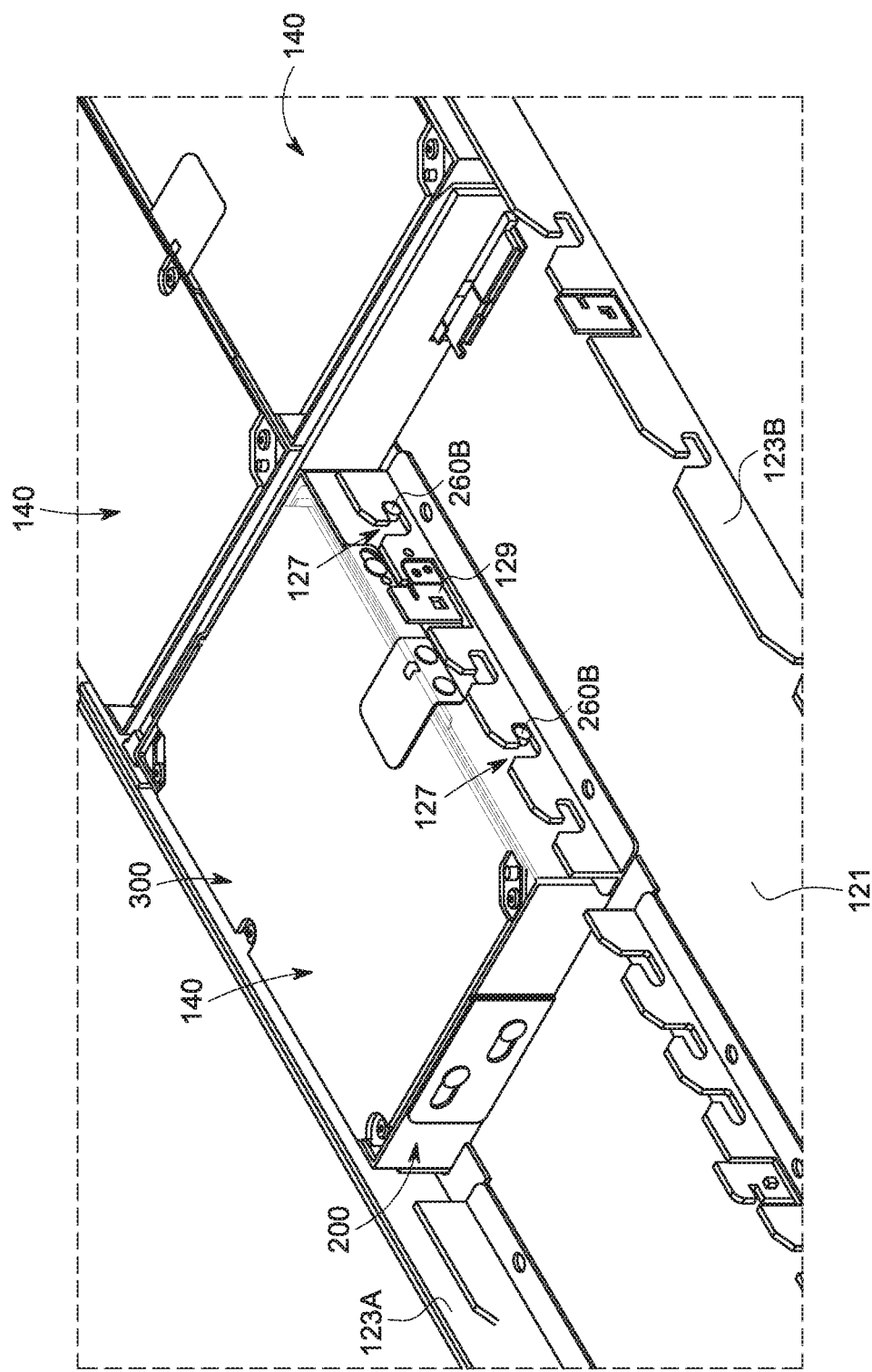
FIG. 10B is a perspective view of the HDD carrier bracket with the HDD installed therein of FIG. 10A installed in the first HDD tray assembly.

The first and second pairs of mounting pins 260A, 260B are for coupling the HDD carrier bracket 200 (with one of the HDDs 140 installed therein as described above in connection with FIGS. 9A-9C) to the HDD tray assembly 120A as is shown in FIGS. 10A and 10B. With the HDD 140 is installed in the HDD carrier bracket 200 as shown in FIG. 9C, the grouping of the HDD carrier bracket 200 and the HDD 140 is referred to herein as a HDD assembly 300.

Referring to FIGS. 6 and 10A, the HDD tray assembly 120A includes a base 121 (FIG. 10A), a first side 123A, a second opposing side 123B, and a front grille 124 (FIG. 6). Coupled to the base 121 and positioned adjacent to the first side 123A is a series of first rails 125. The first rails 125 can be coupled to the base 121 of the HDD tray assembly 120A in a variety of manners (e.g., welding, gluing, fasteners such as screws, rivets, nails, etc., tape, or any combination thereof). Each of the first rails 125 has a generally T-shaped cross-section. While a series of separate and distinct first rails 125 is shown, in some alternative implementations, the first rails 125 can be provided as a single monolithic rail that extends generally from the front end of the HDD tray assembly 120A to the rear end of the HDD tray assembly 120A (in the same or similar fashion that the first side 123A extends as a monolithic structure). The first rails 125 can be referred to as a partition as the first rails 125 generally divide two adjacent sections of the HDD tray assembly 120A.

Coupled to the base 121 and positioned between the first side 123A and the second side 123B is a series of second rails 126. The second rails 126 can be coupled to the base 121 of the HDD tray assembly 120A in a variety of manners (e.g., welding, gluing, fasteners such as screws, rivets, nails, etc., tape, or any combination thereof). Each of the second rails 126 has a generally T-shaped cross-section. While a series of separate and distinct second rails 126 is shown, in some alternative implementations, the second rails 126 can be provided as a single monolithic rail that extends generally from the front end of the HDD tray assembly 120A to the rear end of the HDD tray assembly 120A (in the same or similar fashion that the first side 123A extends as a monolithic structure). The second rails 126 can also be referred to as a partition as the second rails 126 generally divide two adjacent sections of the HDD tray assembly 120A.

Each of the first rails 125, each of the second rails 126, and the second opposing side 123B of the HDD tray assembly 120A forms and/or includes a number of generally L-shaped slots 127 therein. A portion of the generally L-shaped slots 127 point in the direction of arrow X and a second portion of the generally L-shaped slots 127 point in the direction of arrow Y, which is the opposite of arrow X. Specifically, the direction of the generally L-shaped slots 127 alternates for every other one of the series of first rails 125, and for every other one of the series of second rails 126. A similar corresponding pattern occurs for the generally L-shaped slots 127 in the second opposing side 123B. As shown in FIG. 10A, a first one 125A of the first rails 125 includes generally L-shaped slots 127 that point in the direction of arrow X, and a second one 125B of the first rails 125 includes generally L-shaped slots 127 that point in the direction of arrow Y. Such alternating of the generally L-shaped slots 127 in the first rails 125, the second rails 126, and the second opposing side 123B, permits the HDD assemblies 300 to be installed into the HDD tray assembly 120A in alternating directions.

While the second opposing side 123B of the HDD tray assembly 120A is described as being a side of the HDD tray assembly 120A, alternatively, the side 123B can be a rail or series of rails coupled to the base 121 in the same, or similar, manner as the first and second rails 125, 126.

As shown best in FIG. 10B, as the second rails 126 are common for HDD assemblies 300 being installed in the left and right sides of the HDD tray assembly 120A, each of the second rails 126 includes four general L-shaped slots 127, as opposed to two generally L-shaped slots in the first rails 125, and in the corresponding portion of the second opposing side 123B. As noted above, the difference between the spacing of the first and second pairs of chassis mounting pins 260A, 260B aids in preventing installation of the HDD carrier bracket 200 into the HDD tray assembly 120A in the wrong orientation. Additionally, for the second rails 126 to be common and be able to connect with two adjacent HDD assemblies 300, the spacing needs to be different such that the second pair of chassis mounting pins 260B of a first HDD assembly 300 (installed in the right side of the HDD tray assembly 120A) does not interfere with the first pair of chassis mounting pins 260A of a second HDD assembly 300 (installed in the left side of the HDD tray assembly 120A).

Installation of the HDD assembly 300 into the HDD tray assembly 120A does not require any tools. First, as shown in FIG. 10A, the HDD assembly 300 is positioned such that the first and second pairs of chassis mounting pins 260A, 260B are aligned with corresponding ones of the generally L-shaped slots 127. Then the HDD assembly 300 is moved downward such that each of the first and second pairs of chassis mounting pins 260A, 260B is received in its corresponding generally L-shaped slot 127. Then, to connect the electronic coupler 142 of the HDD 140 to the HDD backplane 170, and to lock the HDD assembly 300 into the HDD tray assembly 120A (e.g., via the first and second pairs of chassis mounting pins 260A, 260B coupled to the generally L-shaped slots 127), the HDD assembly 300 is moved/slid in the direction of arrow X to the position shown in FIG. 10B. As such, the HDD assembly 300 is installed.

Figure 11:
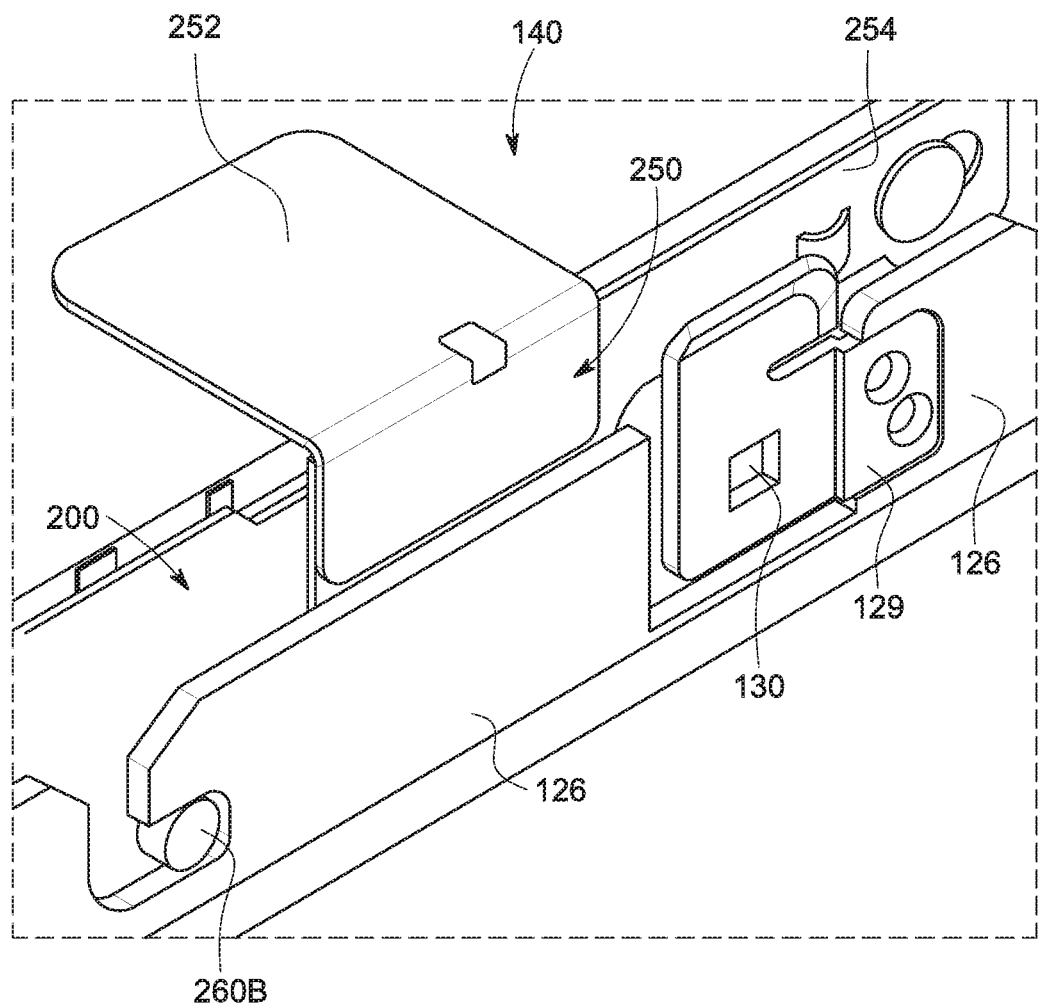
FIG. 11 is an enlarged perspective view of a portion of FIG. 10B illustrating a locking latch of the HDD tray assembly engaging the HDD carrier bracket, according to some implementations of the present disclosure.

As best shown in FIGS. 10B and 11, the one of the second rails 126 that is coupled to the HDD assembly 300 includes a locking latch 129. The locking latch 129 includes a projection or protrusion 130 (FIG. 11) on an inner surface that is configured to engage a locking receiver 270 (see e.g., FIGS. 8A, 8B, 9A, 10A) to aid in maintaining the chassis mounting pins 260A, 260B within the generally L-shaped slots 127 when the HDD assembly 300 is in the position shown in FIG. 10B. The locking receiver 270 can be an aperture through the second frame member 220, a divot therein, or the like.

The locking latch 129 is coupled to the second rail 126 such that the locking latch 129 has some degree of flexibility as the HDD assembly 300 is installed and removed from the HDD tray assembly 120A. For example, as the HDD assembly 300 is installed into the HDD tray assembly 120A, the outer surface of the HDD carrier bracket 200 is configured to engage the projection 130 of the locking latch 129, thereby causing the locking latch 129 to flex outward. Then as the HDD assembly 300 is slid in the direction of arrow X (FIG. 10A) and when the projection 130 engages the locking receiver 270, the locking latch 129 springs backs and/or clicks into place, thereby locking the HDD assembly 300 in place. To remove the HDD assembly 300, in some implementations, the locking latch 129 is flexed and/or bent outward to disengage the projection 130 from the locking receiver 270, thereby permitting the HDD assembly 300 to be slid in the direction of arrow Y, and then removed vertically from the generally L-shaped slots 127.

As is evident from the above, the HDD 140 can be installed into the HDD carrier bracket 200 without tools.

Further, the HDD assembly 300 can be installed into the HDD tray assembly 120A without tools. Further, the HDD tray assembly 120A can be installed into the HDD chassis assembly 100 without tools. Moreover, the HDD chassis assembly 100 can be installed in a rack without tools.

The arrangement of the HDDs 140 in the HDD tray assemblies 120A using the HDD carrier brackets 200 allows for a large amount of HDDs 140 to be included in the housing 102 having a 4U height and a given width. For example, for a housing 102 having the dimensions described herein, eighty-eight HDDs 140 can be included in a standard width and standard depth 4U HDD chassis assembly.

Alternative Implementations

Alternative Implementation 1. A hard disk drive (HDD) chassis assembly comprising: a housing including a plurality of storage bays; a plurality of HDD tray assemblies, each of the plurality of HDD tray assemblies being configured to be removably positioned within one of the plurality of storage bays of the housing, each of the plurality of HDD tray assemblies including a rail, the rail forming at least one generally L-shaped slot therein; and a plurality of HDD carrier brackets, each of the plurality of HDD carrier brackets being configured to be removably coupled to each of the plurality of HDD tray assemblies via the generally L-shaped slot of the rail, each of the plurality of HDD carrier brackets including a first frame member coupled to a second frame member such that the first and second frame members are moveable relative to one another between an extended position and a collapsed position.

Alternative Implementation 2. The HDD chassis assembly of Alternative Implementation 1, wherein each of the plurality of HDD tray assemblies is configured to removably receive eight of the plurality of HDD carrier brackets.

Alternative Implementation 3. The HDD chassis assembly of Alternative Implementation 1, wherein the housing has a height of about 176.2 millimeters, a width of about 447 millimeters, and a depth of about 866 millimeters.

Alternative Implementation 4. The HDD chassis assembly of Alternative Implementation 1, wherein the housing is a standard 4U housing.

Alternative Implementation 5. The HDD chassis assembly of Alternative Implementation 1, wherein the HDD chassis assembly is configured to be mounted within a rack.

Alternative Implementation 6. The HDD chassis assembly of Alternative Implementation 1, wherein the plurality of HDD tray assemblies includes exactly eleven HDD tray assemblies.

Alternative Implementation 7. The HDD chassis assembly of Alternative Implementation 1, wherein the rail has a generally T-shaped cross-section.

Alternative Implementation 8. The HDD chassis assembly of Alternative Implementation 1, wherein each of the plurality of HDD carrier brackets is configured to be installed in one of the plurality of HDD tray assemblies without tools.

Alternative Implementation 9. The HDD chassis assembly of Alternative Implementation 1, further comprising eighty-eight 3.5 inch HDDs, each of the eighty-eight HDDs being coupled to one of the plurality of HDD tray assemblies via one of the plurality of HDD carrier brackets.

Alternative Implementation 10. The HDD chassis assembly of Alternative Implementation 1, wherein the rail forms at least four generally L-shaped slots therein, a first pair of the at least four generally L-shaped slots being configured to be engaged by a first one of the plurality of HDD carrier brackets, and a second pair of the at least four generally L-shaped slots being configured to be engaged by a second one of the plurality of HDD carrier brackets.

Alternative Implementation 11. A hard disk drive (HDD) tray assembly configured to be mounted within a chassis, the HDD tray assembly comprising: a base; a first rail coupled to the base adjacent to a first side of the base, the first rail forming at least two generally L-shaped slots therein; a second rail coupled to the base adjacent to a second opposing side of the base, the second rail forming at least two generally L-shaped slots therein; a third rail coupled to the base between the first and second sides of the base, the third rail forming at least four generally L-shaped slots therein; a first HDD carrier bracket configured to be removably coupled to the at least two generally L-shaped slots of the first rail and a first pair of the at least four generally L-shaped slots of the third rail; and a second HDD carrier bracket configured to be removably coupled to the at least two generally L-shaped slots of the second rail, and a second pair of the at least four generally L-shaped slots of the third rail.

Alternative Implementation 12. The HDD tray assembly of Alternative Implementation 11, wherein each of the first and second HDD carrier brackets includes a first frame member coupled to a second frame member such that the first and second frame members are moveable relative to one another between an extended position and a collapsed position.

Alternative Implementation 13. The HDD tray assembly of Alternative Implementation 11, wherein the third rail is integral with the base.

Alternative Implementation 14. The HDD tray assembly of Alternative Implementation 11, further comprising six additional HDD carrier brackets.

Alternative Implementation 15. The HDD tray assembly of Alternative Implementation 14, further comprising eight 3.5 inch HDDs, a first of the eight 3.5 inch HDDs being coupled to the base via the first HDD carrier bracket, a second of the eight 3.5 inch HDDs being coupled to the base via the second HDD carrier bracket, and the remaining six of the eight 3.5 inch HDDs being coupled to the base via respective ones of the additional six HDD carrier brackets.

Alternative Implementation 16. The HDD tray assembly of Alternative Implementation 15, further comprising a HDD backplane coupled to the base, the HDD backplane including a plurality of HDD connectors configured to electrically connect with each of the eight 3.5 inch HDDs.

Alternative Implementation 17. The HDD tray assembly of Alternative Implementation 11, wherein the HDD tray assembly is configured to be mounted within a chassis.

Alternative Implementation 18. A hard disk drive (HDD) carrier bracket for use in mounting a hard disk drive (HDD) in a chassis via a HDD tray, the HDD carrier bracket comprising: a first generally C-shaped frame member having an outer surface and an opposing inner surface, the first generally C-shaped frame member including a first HDD mounting pin extending from the opposing inner surface of the first generally C-shaped frame member, the first HDD mounting pin being configured to engage a first HDD mounting aperture in a first side of the HDD, the first generally C-shaped frame member including at least two extension pins extending from the outer surface of the first generally C-shaped frame member; a second generally C-shaped frame member having an outer surface and an opposing inner surface, the second generally C-shaped frame member including a second HDD mounting pin extending from the opposing inner surface of the second generally C-shaped frame member, the second HDD mounting pin being configured to engage a second HDD mounting aperture in a second opposing side of the HDD, the second generally C-shaped frame member including at least two extension slots that are configured to engage the at least two extension pins of the first generally C-shaped frame member in a sliding arrangement such that the first generally C-shaped frame member and the second generally C-shaped frame member are slidably relative to one another between an extended position and a collapsed position; a chassis mounting pin extending from the outer surface of the second generally C-shaped frame member, the chassis mounting pin being configured to engage a generally L-shaped slot of a partition of the HDD tray for removably coupling the HDD carrier bracket to the HDD tray; and a flexible tab coupled to the outer surface of the second generally C-shaped frame member, the flexible tab being configured to be being moved in a first direction to cause the chassis mounting pin to move within the generally L-shaped slot of the slide partition such that the HDD carrier bracket is removable from the HDD tray.

Alternative Implementation 19. The HDD carrier bracket of Alternative Implementation 18, wherein at least a portion of the flexible tab is configured to lay generally flat on a surface of the HDD when the hard disk drive is coupled to the HDD carrier bracket.

Alternative Implementation 20. The HDD carrier bracket of Alternative Implementation 18, wherein the second generally C-shaped frame member includes a latch receiver configured to be engaged by a locking latch coupled to the partition of the HDD tray when the HDD carrier bracket is coupled to the HDD tray, the locking latch and the latch receiver cooperating to aid in maintaining the chassis mounting pin within the generally L-shaped slot of the partition.

It is contemplated as falling within the scope of the present disclosure that any one or more elements from any of alternative implementations 1-17 can be combined with any one or more elements from any other of the alternative implementations and/or with any one or more elements from any of the claims below.

What is claimed is:

1. A hard disk drive (HDD) carrier bracket for use in mounting a hard disk drive (HDD) in a chassis via a HDD tray, the HDD carrier bracket comprising:
    a first frame member having a first body and a first pair of arms extending therefrom, the first frame member including a first extension pin extending from a first one of the first pair of arms and a second extension pin extending from a second one of the first pair of arms; and
    a second frame member having a second body and a second pair of arms extending therefrom, the second frame member coupled to the first frame member such that the first and second frame members are moveable relative to one another between an extended position and a collapsed position,
    wherein the HDD carrier bracket is installable in the HDD tray without tools, and wherein the HDD tray is installable in the chassis without tools.

2. The HDD carrier bracket of claim 1, wherein the chassis is a 4U chassis having a width of about 447 millimeters, and wherein the HDD carrier bracket is configured such that eighty-eight of the HDD carrier brackets enable eighty-eight respective HDDs to be mounted in the chassis, each of the eighty-eight HDDs being a 3.5 inch HDD.

3. The HDD carrier bracket of claim 1, further comprising a chassis mounting pin extending from the second body of the second frame member or from the first body of the first frame member, the chassis mounting pin being configured to engage a generally L-shaped slot of a partition of the HDD tray for removably coupling the HDD carrier bracket to the HDD tray.

4. The HDD carrier bracket of claim 3, further comprising a tab coupled to the first frame member or the second frame member, the tab being configured to be moved in a first direction to cause the chassis mounting pin to move within the generally L-shaped slot of the partition such that the HDD carrier bracket is removable from the HDD tray in a second direction that is generally perpendicular to the first direction.

5. The HDD carrier bracket of claim 3, wherein the first or second frame member includes a latch receiver configured to be engaged by a locking latch coupled to the partition of the HDD tray when the HDD carrier bracket is coupled to the HDD tray, the locking latch and the latch receiver cooperating to aid in maintaining the chassis mounting pin within the generally L-shaped slot of the partition.

6. The HDD carrier bracket of claim 1, wherein the second frame member includes a first extension slot formed in a first one of the second pair of arms, and a second extension slot formed in a second one of the second pair of arms.

7. The HDD carrier bracket of claim 6, wherein the first extension pin extending from the first one of the first pair of arms is configured to slidably engage the first extension slot formed in the first one of the second pair of arms, and the second extension pin extending from the second one of the first pair of arms is configured to slidably engage the second extension slot formed in the second one of the second pair of arms, such that the first and second frame members are moveable relative to one another between the extended position and the collapsed position.

8. The HDD carrier bracket of claim 1, wherein the first frame member includes a first pair of staggered extension pins extending from a first one of the first pair of arms, and a second pair of staggered extension pins extending from a second one of the first pair of arms.

9. The HDD carrier bracket of claim 8, wherein the second frame member includes a first pair of staggered extension slots formed in a first one of the second pair of arms, and a second pair of staggered extension slots formed in a second one of the second pair of arms.

10. The HDD carrier bracket of claim 9, wherein the first pair of staggered extension pins extending from the first one of the first pair of arms is configured to slidably engage the first pair of staggered extension slots formed in the first one of the second pair of arms, and the second pair of staggered extension pins extending from the second one of the first pair of arms is configured to slidably engage the second pair of staggered extension slots formed in the second one of the second pair of arms, such that the first and second frame members are moveable relative to one another between the extended position and the collapsed position.

11. The HDD carrier bracket of claim 10, wherein the staggering of the first and second pairs of extension pins and the staggering of the first and second pairs of extension slots aids in preventing rotation of the first and second frame members relative to one another.

12. The HDD carrier bracket of claim 1, wherein the first frame member includes a first HDD mounting pin configured to engage the HDD when the first and second frame members are in the collapsed position.

13. The HDD carrier bracket of claim 12, wherein the second frame member includes a second HDD mounting pin configured to engage the HDD when the first and second frame members are in the collapsed position.

14. The HDD carrier bracket of claim 13, wherein the first HDD mounting pin and the second HDD mounting pin are staggered to aid in preventing rotation of the HDD, relative to the HDD carrier bracket.

15. The HDD carrier bracket of claim 1, wherein a first one of the second pair of arms of the second frame member includes a notch positioned to provide access to a pin connection of the HDD when the HDD is coupled to the HDD carrier bracket and the first and second frame members being in the collapsed position.

16. A hard disk drive (HDD) tray assembly configured to be mounted within a chassis, the HDD tray assembly comprising:
   a base;
   a first rail coupled to the base adjacent to a first side of the base, the first rail forming at least two generally L-shaped slots therein;
   a second rail coupled to the base adjacent to a second opposing side of the base, the second rail forming at least two generally L-shaped slots therein;
   a third rail coupled to the base between the first and second sides of the base, the third rail forming at least four generally L-shaped slots therein;
   a first HDD carrier bracket configured to be removably coupled to the at least two generally L-shaped slots of the first rail and a first pair of the at least four generally L-shaped slots of the third rail; and
   a second HDD carrier bracket configured to be removably coupled to the at least two generally L-shaped slots of the second rail, and a second pair of the at least four generally L-shaped slots of the third rail.

17. The HDD tray assembly of claim 16, wherein each of the first and second HDD carrier brackets includes a first frame member coupled to a second frame member such that the first and second frame members are moveable relative to one another between an extended position and a collapsed position.

18. A hard disk drive (HDD) chassis assembly comprising:
   a housing including a plurality of storage bays;
   a plurality of HDD tray assemblies, each of the plurality of HDD tray assemblies being configured to be removably positioned within one of the plurality of storage bays of the housing, each of the plurality of HDD tray assemblies including a rail, the rail forming at least one generally L-shaped slot therein; and
   a plurality of HDD carrier brackets, each of the plurality of HDD carrier brackets being configured to be removably coupled to each of the plurality of HDD tray assemblies via the generally L-shaped slot of the rail, each of the plurality of HDD carrier brackets including a first frame member coupled to a second frame member such that the first and second frame members are moveable relative to one another between an extended position and a collapsed position,
   wherein the first frame member has a first body and a first pair of arms extending therefrom, and the second frame member has a second body and a second pair of arms extending therefrom, and
   wherein the first frame member includes a first extension pin extending from a first one of the first pair of arms, and a second extension pin extending from a second one of the first pair of arms.

19. The HDD tray assembly of claim 16, wherein each of the first and second HDD carrier brackets includes a first frame member coupled to a second frame member such that the first and second frame members are moveable relative to one another between an extended position and a collapsed position,
   wherein the first frame member has a first body and a first pair of arms extending therefrom, and the second frame member has a second body and a second pair of arms extending therefrom, and
   wherein the first frame member includes a first extension pin extending from a first one of the first pair of arms, and a second extension pin extending from a second one of the first pair of arms.

\* \* \* \* \*